(12) United States Patent
Resconi et al.

(10) Patent No.: US 8,178,636 B2
(45) Date of Patent: *May 15, 2012

(54) PROCESS FOR THE PREPARATION OF ATACTIC 1-BUTENE POLYMERS

(75) Inventors: Luigi Resconi, Ferrara (IT); Simona Guidotti, Altedo-Malalbergo (IT)

(73) Assignee: Basell Polyolefine GmbH, Wesseling (DE)

( * ) Notice: Subject to any disclaimer, the term of this patent is extended or adjusted under 35 U.S.C. 154(b) by 1013 days.

This patent is subject to a terminal disclaimer.

(21) Appl. No.: 11/579,525

(22) PCT Filed: Apr. 25, 2005

(86) PCT No.: PCT/EP2005/004506
§ 371 (c)(1),
(2), (4) Date: Nov. 3, 2006

(87) PCT Pub. No.: WO2005/105865
PCT Pub. Date: Nov. 10, 2005

(65) Prior Publication Data
US 2009/0005523 A1    Jan. 1, 2009

Related U.S. Application Data

(60) Provisional application No. 60/569,141, filed on May 7, 2004, provisional application No. 60/600,409, filed on Aug. 10, 2004.

(30) Foreign Application Priority Data

May 4, 2004    (EP) .................................... 04101912
Aug. 5, 2004   (EP) .................................... 04103779

(51) Int. Cl.
C08F 4/64      (2006.01)
C08F 4/72      (2006.01)
C08F 4/52      (2006.01)
C08F 110/08    (2006.01)
C08F 10/08     (2006.01)

(52) U.S. Cl. ........ 526/161; 526/172; 526/943; 526/941; 526/348.6

(58) Field of Classification Search .................. 526/172, 526/161, 348.6, 160
See application file for complete search history.

(56) References Cited

U.S. PATENT DOCUMENTS

| 3,362,940 | A | | 1/1968 | Edwards et al. |
| 5,302,675 | A | | 4/1994 | Sustic et al. |
| 5,565,533 | A | * | 10/1996 | Galimberti et al. ........... 526/127 |
| 5,698,487 | A | | 12/1997 | Sacchetti et al. |
| 5,770,753 | A | | 6/1998 | Küber et al. |
| 5,786,432 | A | | 7/1998 | Küber et al. |
| 5,830,821 | A | | 11/1998 | Rohrmann et al. |
| 5,840,644 | A | | 11/1998 | Küber et al. |
| 6,051,727 | A | | 4/2000 | Küber et al. |
| 6,057,408 | A | * | 5/2000 | Winter et al. ................. 526/160 |
| 6,242,544 | B1 | | 6/2001 | Küber et al. |
| 6,255,506 | B1 | | 7/2001 | Küber et al. |
| 6,288,192 | B1 | | 9/2001 | Fujita et al. |
| 6,399,533 | B2 | | 6/2002 | Sacchetti et al. |

(Continued)

FOREIGN PATENT DOCUMENTS

DE    19962814    6/2001

(Continued)

OTHER PUBLICATIONS

L. Resoni et al., "1-Olefin Polymerization at Bis(pentamethylcyclopentadienyl)zirconium and -hafnium Centers: Enantioface Selectivity," Macromolecules, vol. 25(25), p. 6814-6817 (1992).

(Continued)

Primary Examiner — Rip A. Lee
(74) Attorney, Agent, or Firm — Dilworth IP LLC

(57) ABSTRACT

A process for obtaining atactic 1-butene polymer optionally containing at least one comonomer selected from ethylene, propylene or an alpha-olefin of formula $CH_2=CHR^o$, wherein $R^o$ is a linear or branched $C_3$-$C_{20}$ alkyl group, comprising the step of polymerizing 1-butene and optionally ethylene, propylene or said alpha-olefin, in the presence of a catalyst system obtainable by contacting:

a) at least one metallocene compound of formula (I) in its meso or meso-like form

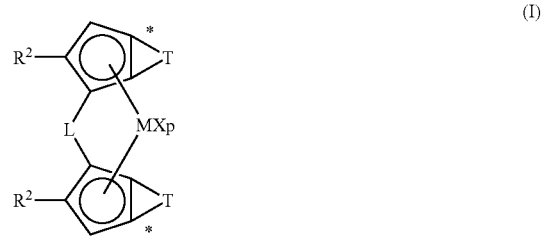

(I)

wherein
M is an atom of a transition metal; p is an integer from 0 to 3; X, same or different, is a hydrogen atom, a halogen atom, or a hydrocarbon group; L is a divalent $C_1$-$C_{40}$ hydrocarbon radical optionally containing heteroatoms belonging to groups 13-17 of the Periodic Table of the Elements; $R^1$ and $R^2$, are $C_1$-$C_{40}$ hydrocarbon radicals; T, equal to or different from each other, is a moiety of formula (IIa) or (IIb):

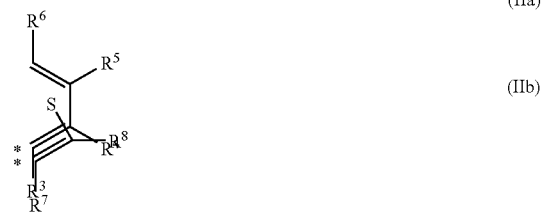

(IIa)

(IIb)

wherein $R^3$ is a $C_1$-$C_{40}$ hydrocarbon radical; $R^4$ and $R^6$, are hydrogen atoms or $C_1$-$C_{40}$ hydrocarbon radicals; $R^5$ is a $C_1$-$C_{40}$ hydrocarbon radical; $R^7$ and $R^8$, equal to or different from each other, are hydrogen atoms or $C_1$-$C_{40}$ hydrocarbon radicals; and b) an alumoxane or a compound capable of forming an alkyl metallocene cation.

10 Claims, No Drawings

U.S. PATENT DOCUMENTS

| | | | |
|---|---|---|---|
| 6,444,833 B1 * | 9/2002 | Ewen et al. | 556/11 |
| 6,492,539 B1 | 12/2002 | Bingel et al. | |
| 6,559,252 B1 | 5/2003 | Horton et al. | |
| 6,608,224 B2 | 8/2003 | Resconi et al. | |
| 6,841,501 B2 | 1/2005 | Resconi et al. | |
| 6,878,786 B2 | 4/2005 | Resconi et al. | |
| 6,953,829 B2 | 10/2005 | Kratzer et al. | |
| 6,963,017 B2 | 11/2005 | Bingel et al. | |
| 7,038,070 B2 | 5/2006 | Bingel et al. | |
| 7,053,160 B1 | 5/2006 | Bingel et al. | |
| 7,074,864 B2 * | 7/2006 | Resconi | 526/160 |
| 7,101,940 B2 | 9/2006 | Schottek et al. | |
| 7,109,278 B2 | 9/2006 | Okumura et al. | |
| 7,314,903 B2 | 1/2008 | Resconi et al. | |
| 7,342,078 B2 | 3/2008 | Schottek et al. | |
| 7,531,609 B2 * | 5/2009 | Resconi et al. | 526/161 |
| 7,776,978 B2 * | 8/2010 | Tonti et al. | 526/116 |
| 7,799,871 B2 * | 9/2010 | Resconi et al. | 525/191 |
| 2003/0069320 A1 | 4/2003 | Minami et al. | |
| 2004/0132612 A1 | 7/2004 | Resconi et al. | |
| 2006/0020096 A1 | 1/2006 | Schottek et al. | |
| 2006/0052553 A1 | 3/2006 | Resconi et al. | |
| 2007/0149729 A1 | 6/2007 | Resconi | |
| 2007/0155919 A1 | 7/2007 | Okumura et al. | |
| 2007/0260023 A1 | 11/2007 | Jones et al. | |
| 2007/0276095 A1 | 11/2007 | Resconi et al. | |
| 2008/0027190 A1 * | 1/2008 | Tonti et al. | 526/116 |
| 2008/0319135 A1 * | 12/2008 | Resconi et al. | 525/240 |

FOREIGN PATENT DOCUMENTS

| | | |
|---|---|---|
| DE | 19962910 | 7/2001 |
| DE | 10324541 | 12/2004 |
| EP | 576970 | 1/1994 |
| EP | 604908 | 7/1994 |
| EP | 629632 | 12/1994 |
| EP | 633272 | 1/1995 |
| EP | 930320 | 7/1999 |
| JP | 11193309 | 7/1999 |
| WO | 91/02012 | 2/1991 |
| WO | 92/00333 | 1/1992 |
| WO | 95/32995 | 12/1995 |
| WO | 98/40331 | 9/1998 |
| WO | 99/21899 | 5/1999 |
| WO | 00/31090 | 6/2000 |
| WO | 01/21674 | 3/2001 |
| WO | 01/44318 | 6/2001 |
| WO | 01/48034 | 7/2001 |
| WO | 01/62764 | 8/2001 |
| WO | 02/060963 | 8/2002 |
| WO | 02/100909 | 12/2002 |
| WO | 02/102811 | 12/2002 |
| WO | 03/045551 | 6/2003 |
| WO | 03/045964 | 6/2003 |
| WO | 03/050131 | 6/2003 |
| WO | 2004/005360 | 1/2004 |
| WO | 2004/048424 | 6/2004 |
| WO | 2004/050724 | 6/2004 |
| WO | 2004/106351 | 12/2004 |
| WO | 2005/023889 | 3/2005 |
| WO | 2005/058916 | 6/2005 |
| WO | 2005/095468 | 10/2005 |
| WO | 2005/118654 | 12/2005 |
| WO | 2006/008211 | 1/2006 |
| WO | 2006/065809 | 6/2006 |
| WO | 2006/097497 | 9/2006 |
| WO | 2006/097500 | 9/2006 |
| WO | 2006/134046 | 12/2006 |

OTHER PUBLICATIONS

C. Carman et al., "Monomer Sequence Distribution in Ethylene-Propylene Rubber Measured by $^{13}$C NMR. 3. Use of Reaction Probability Model," *Macromolecules*, vol. 10(3), p. 536-544 (1977).

M. Vathauer et al, "Homopolymerizations of α-Olefins with Diastereomeric Metallocene/MAO Catalysts," *Macromolecules*, vol. 33(6), p. 1955-1959 (2000).

M. Fujita et al., "Synthesis of Ultra-High-Molecular-Weight Poly(α-olefin)s by Thiobis(phenoxy)-titanium/Modified Methylaluminoxane System," *Journal of Polymer Science: Part A: Polymer Chemistry*, vol. 42, p. 1107-1111 (2004).

Z. Fan et al., "Copolymerization of Propylene with 1-Octene Catalyzed by *rac*-Me$_2$Si(2,4,6-Me$_3$-Ind)$_2$ZrCl$_2$/Methyl Aluminoxane," *Journal of Polymer Science: Part A: Polymer Chemistry*, vol. 38, p. 4299-4307 (2000).

N. Naga et al., "Polymerization behavior of α-olefins with *rac*- and *meso*-type *ansa*-metallocene catalysts: Effects of cocatalyst and metallocene ligand," *Macromol. Chem. Phys.*, vol. 200(7), p. 1587-1594 (1999).

N. Naga et al., "Effect of co-catalyst system on α-olefin polymerization with *rac*- and *meso*-[dimethylsilylenebis(2,3,5-trimethyl-cyclopentadienyl)]zirconium dichloride," *Macromol, Rapid Commum.*, vol. 18, p. 581-589 (1997).

L. Resconi et al., "Selectivity in Propene Polymerization with Metallocene Catalysts," *Chem. Rev.*, vol. 100(4), p. 1253-1345 (2000).

M. Kakugo et al., "$^{13}$C NMR Determination of Monomer Sequence Distribution in Ethylene-Propylene Copolymers Prepared with δ-TiCl$_3$-Al(C$_2$H$_5$)$_2$Cl," *Macromolecules*, vol. 15(4), p. 1150-1152 (1982).

* cited by examiner

PROCESS FOR THE PREPARATION OF ATACTIC 1-BUTENE POLYMERS

The present invention relates to a process for the preparation of atactic and amorphous polymers of 1-butene, by polymerizing 1-butene and optionally an alpha-olefin in the presence of a metallocene catalyst component in the isomeric meso or meso like form.

Amorphous polymers of 1-butene have been mainly used as sticking agents, improving agents for crystalline polyolefins and the like. They have been obtained by using different catalyst systems.

For example U.S. Pat. No. 6,288,192 relates to amorphous polymers of 1-butene having ultra-high molecular weight, obtained by using compounds such as dichloro{2,2'-thiobis [4-methyl-6-(tert-butyl)phenolato]}titanium. These compounds are completely different from metallocene compounds. The document describes 1-butene polymers having a Mn of 200,000 or more, preferably of 300,000 or more, and more preferably of 500,000 or more. However, the Mn of the 1-butene polymers of the examples is much higher, in particular it ranges from about 1 million to about 3,5 millions. Even though the document states that a chain transfer agent such as hydrogen can be used to control the molecular weight, it is known from WO 02/060963 that the molecular weight of the polymers produced by thiobis(phenoxy)titanium dichlorides is relatively hydrogen insensitive. Therefore, it is not possible to lower the molecular weight of the 1-butene polymers below 1 million by using hydrogen as molecular weight regulator and consequently the disclosure of U.S. Pat. No. 6,288,192 of Mn values of less than 1 million is considered not enabling. Moreover, even if U.S. Pat. No. 6,288,192 does not relates about the NMR structure of the polyl-butene obtained, in Journal of polymer Science: Part A: Polymer Chemistry, vol. 42, 1107-1111 (2004) the inventors analysed the polymer obtained with the process described in the US patent, showing that said polybutene obtained is slightly isotactic, with mmmm pentad content of about 25%.

In the U.S. patent application 2003/0069320 1-butene polymers obtained by using double-bridged metallocene compounds are described. The 1-butene homo- and copolymers thus obtained are not completely amorphous, being characterised by at least one melting point. In Example 17 of EP 604908 a polybutene polymer by using dimethylsilanediylbis(9-fluorenyl) zirconium dichloride has been obtained. However this metallocene compounds has a $C_{2v}$ symmetry and consequently it does not present the racemic and meso isomeric form. The polymer obtained ha a molecular weight (I.V.) that can be further increased, and the catalyst activity was low.

Amorphous propylene/1-butene copolymers by using metallocene compounds bearing one single cyclopentadienyl-substituent are described in JP 11-193309. The copolymers thus obtained are characterised by high propylene content.

In Macromol. Chem. Phys, 200, 1587-1594 (1999) it is disclosed a process for polymerizing 1-butene in the presence of a rac/meso $Me_2Si(2\text{-Me-Ind})_2ZrCl_2$. However the molecular weight of the atactic fraction of the obtained polymer reported in table 1 is very low.

In Macromol. Rapid Commun. 18, 581-589, (1997) a rac and meso mixture of dimethylsilylenebis(2,3,5-trimethyl-cyclopentadienyl) zirconium dichloride has been used for polymerizing 1-butene. Also in this case the molecular weight of the atactic fraction is very low.

In Macromolecules 2000, 33, 1955-1959 a rac meso mixture of 3 different metallocene compounds, namely $Me_2Si(2\text{-Me-4,5-BzoInd})_2ZrCl_2$, $Me_2Si(2\text{-Me-4-PhInd})_2ZrCl_2$ and $Me_2Si(Ind)_2ZrCl_2$ have been tested in 1-butene polymerization. However the molecular weight of the atactic polybutene and the activity can be still improved as shown in the comparative examples of the present application.

A new process that permits to obtain atactic and amorphous 1-butene polymers with high molecular weight and in high yield is therefore desirable.

An object of the present invention is a process for obtaining atactic and amorphous 1-butene polymers optionally containing at least one comonomer selected from ethylene, propylene or an alpha-olefin of formula $CH_2=CHR^\circ$, wherein $R^\circ$ is a linear or branched $C_3$-$C_{20}$ alkyl group, comprising the step of polymerising 1-butene and optionally ethylene, propylene or said alpha-olefin in the presence of a catalyst system obtainable by contacting:

a) at least one metallocene compound of formula (I) in its meso or meso-like form

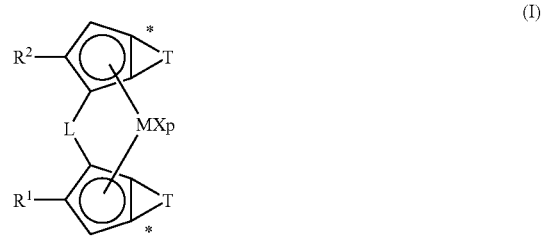

wherein
M is an atom of a transition metal selected from those belonging to group 3, 4, 5, 6 or to the lanthanide or actinide groups in the Periodic Table of the Elements; preferably M is titanium, zirconium or hafnium;
p is an integer from 0 to 3, preferably p is 2, being equal to the formal oxidation state of the metal M minus 2;
X, same or different, is a hydrogen atom, a halogen atom, or a R, OR, $OSO_2CF_3$, OCOR, SR, $NR_2$ or $PR_2$ group, wherein R is a are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably R is a linear or branched $C_1$-$C_{20}$-alkyl radical; or two X can optionally form a substituted or unsubstituted butadienyl radical or a OR'O group wherein R' is a divalent radical selected from $C_1$-$C_{40}$ alkylidene, $C_6$-$C_{40}$ arylidene, $C_7$-$C_{40}$ alkylarylidene and $C_7$-$C_{40}$ arylalkylidene radicals; preferably X is a hydrogen atom, a halogen atom or a R group; more preferably X is chlorine or a $C_1$-$C_{10}$-alkyl radical; such as methyl, or ethyl radicals;
L is a divalent $C_1$-$C_{40}$ hydrocarbon radical optionally containing heteroatoms belonging to groups 13-17 of the Periodic Table of the Elements or a divalent silylidene radical containing up to 5 silicon atom; preferably L is a divalent bridging group selected from $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radicals optionally containing heteroatoms belonging to groups 13-17 of the Periodic Table of the Elements, and silylidene radical containing up to 5 silicon atoms such as $SiMe_2$, $SiPh_2$; preferably L is a group $(Z(R'')_2)_n$ wherein Z is a carbon or a silicon atom, n is 1 or 2 and R'' is a $C_1$-$C_{20}$ hydrocarbon radical optionally containing heteroatoms belonging to groups 13-17 of the Periodic Table of the Elements; preferably R'' is a linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals optionally containing heteroatoms belonging to groups 13-17 of the Periodic Table of the Elements; more preferably the group $(Z(R'')_2)_n$ is $Si(CH_3)_2$, $SiPh_2$, $SiPhMe$, $SiMe(SiMe_3)$, $CH_2$, $(CH_2)_2$, and $C(CH_3)_2$;

$R^1$ and $R^2$, equal to or different from each other, are $C_1$-$C_{40}$ hydrocarbon radicals optionally containing heteroatoms belonging to groups 13-17 of the Periodic Table of the Elements; preferably they are linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^1$ and $R^2$ are linear or branched, saturated or unsaturated $C_1$-$C_{20}$-alkyl radicals; more preferably $R^1$ and $R^2$ are methyl or ethyl radicals;

T, equal to or different from each other, is a moiety of formula (IIa) or (IIb):

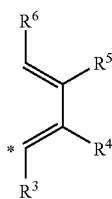

(IIa)

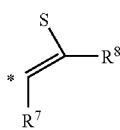

(IIb)

wherein the atom marked with the symbol * bonds the atom marked with the same symbol in the compound of formula (I);

$R^3$ is a $C_1$-$C_{40}$ hydrocarbon radical optionally containing heteroatoms belonging to groups 13-17 of the Periodic Table of the Elements; preferably $R_3$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-arylalkyl or a $C_7$-$C_{40}$-alkylaryl radical; optionally containing heteroatoms belonging to groups 13-17 of the Periodic Table of the Elements; more preferably $R^3$ is a linear or branched, $C_1$-$C_{20}$-alkyl $C_6$-$C_{40}$-aryl, $C_7$-$C_{40}$-arylalkyl radical; even more preferably $R^3$ is a $C_6$-$C_{20}$-aryl radical optionally substituted with one or more $C_1$-$C_{10}$ alkyl groups;

$R^4$ and $R^6$, equal to or different from each other, are hydrogen atoms or $C_1$-$C_{40}$ hydrocarbon radicals optionally containing heteroatoms belonging to groups 13-17 of the Periodic Table of the Elements; preferably $R^4$ and $R^6$, equal to or different from each other, are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; preferably $R^4$ and $R^6$ are hydrogen atoms;

$R^5$ is a $C_1$-$C_{40}$ hydrocarbon radical optionally containing heteroatoms belonging to groups 13-17 of the Periodic Table of the Elements; preferably $R^5$ is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements; more preferably $R^5$ is a linear or branched, saturated or unsaturated $C_1$-$C_{20}$-alkyl radical; even more preferably $R^5$ is a methyl or ethyl radical;

$R^7$ and $R^8$, equal to or different from each other, are hydrogen atoms or $C_1$-$C_{40}$ hydrocarbon radicals optionally containing heteroatoms belonging to groups 13-17 of the Periodic Table of the Elements; preferably $R^7$ and $R^8$ are hydrogen atoms or linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radicals; optionally containing heteroatoms belonging to groups 13-17 of the Periodic Table of the Elements;

preferably $R^8$ is a hydrogen atom or a linear or branched, saturated or unsaturated $C_1$-$C_{20}$-alkyl radical; more preferably $R^8$ is a methyl or ethyl radical;

preferably $R^7$ is a $C_1$-$C_{40}$-alkyl, $C_6$-$C_{40}$-aryl or a $C_7$-$C_{40}$-arylalkyl; more preferably $R^7$ is a group of formula (III)

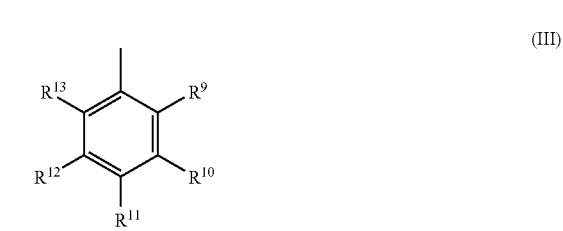

(III)

wherein $R^9$, $R^{10}$, $R^{11}$, $R^{12}$ and $R^{13}$, equal to or different from each other, are hydrogen atoms or linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals; optionally containing heteroatoms belonging to groups 13-17 of the Periodic Table of the Elements; preferably $R^9$, and $R^{12}$ are a hydrogen atoms; $R^{10}$, $R^{11}$ and $R^{13}$ are preferably hydrogen atoms or linear or branched, cyclic or acyclic, $C_1$-$C_{10}$-alkyl radicals;

b) an alumoxane or a compound capable of forming an alkyl metallocene cation; and optionally c) an organo aluminum compound.

For the purpose of the present invention the term "meso form" means that the same substituents on the two cyclopentadienyl moieties are on the same side with respect to the plane containing the zirconium and the centre of the said cyclopentadienyl moieties.

"Meso-like form" means that the bulkier substituents of the two cyclopentadienyl moieties on the metallocene compound are on the same side with respect to the plane containing the zirconium and the centre of the said cyclopentadienyl moieties as shown in the following compound:

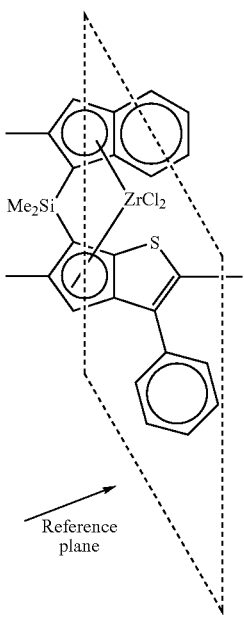

In one embodiment, the compound of formula (I) has the following formula (IV)

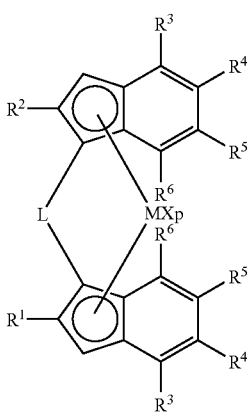

wherein
M, X, p, L, $R^1$, $R^2$, $R^3$, $R^4$, $R^5$ and $R^6$ have the above described meaning.

In an alternative embodiment the compound of formula (I) has the following formula (V)

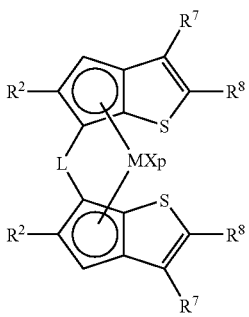

wherein M, X, p, L, $R^1$, $R^2$, $R^7$ and $R^8$ have the above described meaning.

Metallocene compounds of formula (I) are well known in the art, they can be prepared according to known procedures, such as those described in WO 01/44318, WO 03/045964, PCT/EP02/13552 and DE 10324541.3.

Alumoxanes used as component b) can be obtained by reacting water with an organo-aluminium compound of formula $H_jAlU_{3-j}$ or $H_jAl_2U_{6-j}$, where the U substituents, same or different, are hydrogen atoms, halogen atoms, $C_1$-$C_{20}$-alkyl, $C_3$-$C_{20}$-cyclalkyl, $C_6$-$C_{20}$-aryl, $C_7$-$C_{20}$-alkylaryl or $C_7$-$C_{20}$-arylalkyl radicals, optionally containing silicon or germanium atoms, with the proviso that at least one U is different from halogen, and j ranges from 0 to 1, being also a non-integer number. In this reaction the molar ratio Al/water is preferably comprised between 1:1 and 100:1.

The alumoxanes used in the process according to the invention are considered to be linear, branched or cyclic compounds containing at least one group of the type:

wherein the substituents U, same or different, are defined above.

In particular, alumoxanes of the formula:

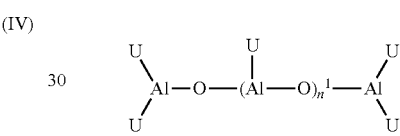

can be used in the case of linear compounds, wherein $n^1$ is 0 or an integer of from 1 to 40 and the substituents U are defined as above; or alumoxanes of the formula:

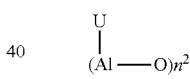

can be used in the case of cyclic compounds, wherein $n^2$ is an integer from 2 to 40 and the U substituents are defined as above.

Examples of alumoxanes suitable for use according to the present invention are methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl)alumoxane (TTMBAO).

Particularly interesting cocatalysts are those described in WO 99/21899 and in WO01/21674 in which the alkyl and aryl groups have specific branched patterns.

Non-limiting examples of aluminium compounds that can be reacted with water to give suitable alumoxanes (b), described in WO 99/21899 and WO01/21674, are: tris(2,3,3-trimethyl-butyl)aluminium, tris(2,3-dimethyl-hexyl)aluminium, tris(2,3-dimethyl-butyl)aluminium, tris(2,3-dimethyl-pentyl)aluminium, tris(2,3-dimethyl-heptyl)aluminium, tris(2-methyl-3-ethyl-pentyl)aluminium, tris(2-methyl-3-ethyl-hexyl)aluminium, tris(2-methyl-3-ethyl-heptyl)aluminium, tris(2-methyl-3-propyl-hexyl)aluminium, tris(2-ethyl-3-methyl-butyl)aluminium, tris(2-ethyl-3-methyl-pentyl)aluminium, tris(2,3-diethyl-pentyl)aluminium, tris(2-propyl-3-methyl-butyl)aluminium, tris(2-isopropyl-3-methyl-butyl)aluminium, tris(2-isobutyl-3- methyl-pentyl)aluminium, tris(2,3,3-trimethyl-pentyl) aluminium, tris(2,3,3-trimethyl-hexyl)aluminium, tris(2-ethyl-3,3-dimethyl-butyl)aluminium, tris(2-ethyl-3,3-dimethyl-pentyl)aluminium, tris(2-isopropyl-3,3-dimethyl-butyl)aluminium, tris(2-trimethylsilyl-propyl)aluminium, tris(2-methyl-3-phenyl-butyl)aluminium, tris(2-ethyl-3-phenyl-butyl)aluminium, tris(2,3-dimethyl-3-phenyl-butyl)aluminium, tris(2-phenyl-propyl)aluminium, tris[2-(4-fluorophenyl)-propyl]aluminium, tris[2-(4-chloro-phenyl)-propyl] aluminium, tris[2-(3-isopropyl-phenyl)-propyl]aluminium, tris(2-phenyl-butyl)aluminium, tris(3-methyl-2-phenyl-butyl)aluminium, tris(2-phenyl-pentyl)aluminium, tris[2-(pentafluorophenyl)-propyl]aluminium, tris[2,2-diphenyl-ethyl] aluminium and tris[2-phenyl-2-methyl-propyl]aluminium, as well as the corresponding compounds wherein one of the hydrocarbyl groups is replaced with a hydrogen atom, and those wherein one or two of the hydrocarbyl groups are replaced with an isobutyl group.

Amongst the above aluminium compounds, trimethylaluminium (TMA), triisobutylaluminium (TIBA), tris(2,4,4-trimethyl-pentyl)aluminium (TIOA), tris(2,3-dimethylbutyl) aluminium (TDMBA) and tris(2,3,3-trimethylbutyl) aluminium (TTMBA) are preferred.

Non-limiting examples of compounds able to form an alkylmetallocene cation are compounds of formula $D^+E^-$, wherein $D^+$ is a Brønsted acid, able to donate a proton and to irreversibly react with a substituent X of the metallocene of formula (I) and $E^-$ is a compatible anion, which is able to stabilize the active catalytic species originating from the reaction of the two compounds, and which is sufficiently labile to be removed by an olefinic monomer. Preferably, the anion $E^-$ comprises one or more boron atoms. More preferably, the anion $E^-$ is an anion of the formula $BAr_4^{(-)}$, wherein the substituents Ar, which can be identical or different, are aryl radicals such as phenyl, pentafluorophenyl or bis(trifluoromethyl)phenyl. Tetrakis-pentafluorophenyl borate is particularly preferred compound, as described in WO 91/02012. Moreover, compounds of formula $BAr_3$ can be conveniently used. Compounds of this type are described, for example, in the International patent application WO 92/00333. Other examples of compounds able to form an alkylmetallocene cation are compounds of formula $BAr_3P$ wherein P is a substituted or unsubstituted pyrrol radical. These compounds are described in WO01/62764. Compounds containing boron atoms can be conveniently supported according to the description of DE-A-19962814 and DE-A-19962910. All these compounds containing boron atoms can be used in a molar ratio between boron and the metal of the metallocene comprised between about 1:1 and about 10:1; preferably 1:1 and 2.1; more preferably about 1:1.

Non limiting examples of compounds of formula $D^+E^-$ are:
Triethylammoniumtetra(phenyl)borate,
Tributylammoniumtetra(phenyl)borate,
Trimethylammoniumtetra(tolyl)borate,
Tributylammoniumtetra(tolyl)borate,
Tributylammoniumtetra(pentafluorophenyl)borate,
Tributylammoniumtetra(pentafluorophenyl)aluminate,
Tripropylammoniumtetra(dimethylphenyl)borate,
Tributylammoniumtetra(trifluoromethylphenyl)borate,
Tributylammoniumtetra(4-fluorophenyl)borate,
N,N-Dimethylbenzylammonium-tetrakispentafluorophenylborate,
N,N-Dimethylhexylamonium-tetrakispentafluorophenylborate,
N,N-Dimethylaniliniumtetra(phenyl)borate,
N,N-Diethylaniliniumtetra(phenyl)borate,
N,N-Dimethylaniliniumtetrakis(pentafluorophenyl)borate,
N,N-Dimethylaniliniumtetrakis(pentafluorophenyl)aluminate,
N,N-Dimethylbenzylammonium-tetrakispentafluorophenylborate,
N,N-Dimethylhexylamonium-tetrakispentafluorophenylborate,
Di(propyl)ammoniumtetrakis(pentafluorophenyl)borate,
Di(cyclohexyl)ammoniumtetrakis(pentafluorophenyl)borate,
Triphenylphosphoniumtetrakis(phenyl)borate,
Triethylphosphoniumtetrakis(phenyl)borate,
Diphenylphosphoniumtetrakis(phenyl)borate,
Tri(methylphenyl)phosphoniumtetrakis(phenyl)borate,
Tri(dimethylphenyl)phosphoniumtetrakis(phenyl)borate,
Triphenylcarbeniumtetrakis(pentafluorophenyl)borate,
Triphenylcarbeniumtetrakis(pentafluorophenyl)aluminate,
Triphenylcarbeniumtetrakis(phenyl)aluminate,
Ferroceniumtetrakis(pentafluorophenyl)borate,
Ferroceniumtetrakis(pentafluorophenyl)aluminate.
Triphenylcarbeniumtetrakis(pentafluorophenyl)borate, and N,N-Dimethylaniliniumtetrakis(pentafluorophenyl)borate.

Organic aluminum compounds used as compound c) are those of formula $H_jAlU_{3-j}$ or $H_jAl_2U_{6-j}$ as described above.

The polymerization process of the present invention can be carried out in liquid phase, optionally in the presence of an inert hydrocarbon solvent, or in gas phase. Said hydrocarbon solvent can be either aromatic (such as toluene) or aliphatic (such as propane, hexane, heptane, isobutane, cyclohexane and 2,2,4-trimethylpentane). Preferably, the polymerization process of the present invention is carried out by using liquid 1-butene as polymerization medium. Preferably in bulk.

The polymerization temperature preferably ranges from 0° C. to 250° C.; preferably comprised between 20° C. and 150° C. and, more particularly between 40° C. and 90° C.; The molecular weight distribution can be varied by using mixtures of different metallocene compounds or by carrying out the polymerization in several stages which differ as to the polymerization temperature and/or the concentrations of the molecular weight regulators and/or the monomers concentration. By carrying out the polymerization process using a combination of two different metallocene compounds of formula (I), a polymer endowed with a broad melting is produced.

Moreover, it has been surprisingly found that the activity of the catalyst system is increased when 1-butene is polymerised in presence of at least one comonomer selected from ethylene, propylene or an alpha-olefin of formula $CH_2=CHR^o$, wherein $R^o$ is a linear or branched $C_3$-$C_{20}$ alkyl group. Therefore it is possible to increase the activity of the process of the present invention by adding even small amounts of comonomers selected from ethylene, propylene or said alpha-olefins. Preferably, 1-butene is polymerised in presence of up to 60% by moles, preferably up to 50% by moles, more preferably 5-30% by moles, of at least one of said comonomers. In a particularly preferred embodiment, the comonomer is a propylene, 1-pentene, 1-hexene, or 1-octene; more preferably the comonomer is propylene.

With the process of the present invention atactic and amorphous 1-butene homopolymers and copolymers endowed with high molecular weights can be obtained in high yields.

In particular in the 1-butene polymers obtained according to the present invention the enthalpy of fusion is not detectable at a differential scanning calorimeter (DSC), the polymers being completely amorphous. The atacticity of the 1-butene polymers obtainable with the process of the present invention is shown by the particular low value of the mmmm pentads; in particular the value of the mmmm pentads for the homopolymers is lower than 20.

A further object of the present invention is an atactic amorphous 1-butene homopolymer having the following characteristics:

(i) intrinsic viscosity (I.V.) measured in tetrahydronaphtalene (THN) at 135° C. equal to or higher than 1.30 dL/g; preferably the intrinsic viscosity is higher than 1.80 dL/g; more preferably higher than 2.0 dL/g;
(ii) a distribution of molecular weight Mw/Mn lower than 4; preferably lower than 3.5; more preferably higher than 2.5 and lower than 3.5;
(iii) no enthalpy of fusion detectable at a differential scanning calorimeter (DSC).
(iv) isotactic pentad (mmnm) lower than 20% preferably lower than 15%: more preferably lower than 10%.

As described above, with the process of the present invention it is possible to obtain in high yield 1-butene copolymers. Said copolymers are characterized by the fact to be completely atactic, i.e. even the 1-butene block in the polymer chain is atactic. Therefore the main effect of the comonomer is to increase the yield of the process and not to destroy the crystallinity of the resulting polymer, as usually happens when 1-butene is copolymerized by using catalyst system that produce crystalline polymers.

A still further object of the present invention is an atactic amorphous 1-butene copolymer containing up to 51% by moles, preferably up to 50% by moles of comonomer units derived from ethylene, propylene or an alpha-olefin of formula $CH_2=CHR^o$, wherein $R^o$ is a linear or branched $C_3$-$C_{10}$ alkyl group, preferably comprising 5-30% by moles of ethylene, propylene or said alpha-olefin, having the following features:

(i) intrinsic viscosity (I.V.) measured in tetrahydronaphtalene (THN) at 135° C. of from 1.00 to 2.50 dl/g, preferably of from 1.79 to 2.31 dl/g;
(ii) a distribution of molecular weight Mw/Mn lower than 4; preferably lower than 3.5; more preferably lower than 3;
(iii) no enthalpy of fusion detectable at a differential scanning calorimeter (DSC).

Preferably the comonomer derived units are selected from propylene, 1-pentene, 1-hexene, or 1-octene; still more preferably the comonomer units are propylene.

The atactic amorphous 1-butene copolymer of the invention preferably has intrinsic viscosity (I.V.) measured in tetrahydronaphtalene (THN) at 135° C. of from 1.00 to 2.50 dl/g, preferably of from 1.79 to 2.31 dl/g; provided that the viscosity is not from 1.78 to 1.79 dl/g or from 2.31 to 2.32 dl/g.

The atactic amorphous 1-butene copolymer of the invention is preferably endowed with a r1xr2 reactivity ratio measured as described in the example raging from 0.80 to 1.20; preferably ranging from 0.90 to 1.10; more preferably it ranges from 0.95 to 1.05.

If the intrinsic viscosity (I.V.) of the 1-butene copolymers of the invention is higher than 2.50 dl/g the processability of the copolymers decreases below acceptable values since the flowability of the melted polymer abruptly decreases. If the intrinsic viscosity is lower than 1.00 dl/g the atactic amorphous 1-butene copolymers of the invention are unacceptably sticky.

The atactic amorphous 1-butene homo- and copolymers obtainable by the process of the present invention, can be used as component for polymer compositions. In particular, due to the high molecular weight, they can be used in compositions comprising isotactic polypropylene homo or copolymers.

The following examples are given to illustrate and not to limit the invention.

EXAMPLES

The intrinsic viscosity (I.V.) was measured in tetrahydronaphtalene (THN) at 135° C. Mw and Mn were calculated by using the following empirical equations:

$$Mw=59403(I.V.)^2+137760(I.V.)$$

$$Mn=32996(I.V.)^2+53607(I.V.)$$

The melting points of the polymers ($T_m$) were measured by Differential Scanning Calorimetry (D.S.C.) on a Perkin Elmer DSC-7 instrument, according to the standard method. A weighted sample (5-10 mg) obtained from the polymerization was sealed into aluminum pans and heated at 180° C. with a scanning speed corresponding to 10° C./minute. The sample was kept at 180° C. for 5 minutes to allow a complete melting of all the crystallites. Successively, after cooling to 20° C. with a scanning speed corresponding to 10° C./minute, and after standing 2 minutes at 20° C., the sample was heated for the second time at 180° C. with a scanning speed corresponding to 10° C./min. In this second heating run, the peak temperature was taken as the melting temperature ($T_m$) and the area as enthalpy of fusion ($\Delta H_f$).

Molecular weight parameters and molecular weight distribution for all the samples were measured using a Waters 150C ALC/GPC instrument (Waters, Milford, Mass., USA) equipped with four mixed-gel columns PLgel 20 μm Mixed-A LS (Polymer Laboratories, Church Stretton, United Kingdom). The dimensions of the columns were 300×7.8 mm. The solvent used was TCB and the flow rate was kept at 1.0 mL/min. Solution concentrations were 0.1 g/dL in 1,2,4 trichlorobenzene (TCB). 0.1 g/L of 2,6-di-t-butyl-4-methyl phenol (BHT) was added to prevent degradation and the injection volume was 300 μL. All the measurements were carried out at 135° C. GPC calibration is complex, as no well-characterized narrow molecular weight distribution standard reference materials are available for 1-butene polymers. Thus, a universal calibration curve was obtained using 12 polystyrene standard samples with molecular weights ranging from 580 to 13,200,000. It was assumed that the K values of the Mark-Houwink relationship were: $K_{PS}=1.21\times 10^{-4}$ dL/g and $K_{PB}=1.78\times 10^{-4}$ dL/g for polystyrene and poly-1-butenes respectively. The Mark-Houwink exponents a were assumed to be 0.706 for polystyrene and 0.725 for poly-1-butenes. Even though, in this approach, the molecular parameters obtained were only an estimate of the hydrodynamic volume of each chain, they allowed a relative comparison to be made.

NMR analysis. $^{13}$C-NMR spectra were acquired on a DPX400 spectrometer operating at 100.61 MHz in the Fourier transform mode at 120° C. The samples were dissolved in 1,1,2,2-tetrachloroethane-d2 at 120° C. with a 8% wt/v concentration. Each spectrum was acquired with a 90° pulse, 15 seconds of delay between pulses and CPD (waltz16) to remove $^1$H-$^{13}$C coupling. About 3000 transients were stored in 32K data points using a spectral window of 6000 Hz. The isotacticity of metallocene-made PB is measured by $^{13}$C NMR, and is defined as the relative intensity of the mmmm pentad peak of the diagnostic methylene of the ethyl branch.

This peak at 27.73 ppm was used as internal reference. Pentad assignments are given according to *Macromolecules*, (1992), 25, 6814-6817. The copolymer composition has been determined from the diads as follows:

$$PP=[S\alpha\alpha(47.5-45.9 \text{ ppm})/\Sigma(S\alpha\alpha)] \times 100$$

$$PB=[S\alpha\alpha(44.1-42.8 \text{ ppm})/\Sigma(S\alpha\alpha)] \times 100$$

$$BB=[S\alpha\alpha(39.93-40.31 \text{ ppm})/\Sigma(S\alpha\alpha)] \times 100$$

$\Sigma(S\alpha\alpha)$=sum of $S\alpha\alpha$ peak areas=$S\alpha\alpha(47.5-45.9$ ppm$)+S\alpha\alpha(44.1-42.8$ ppm$)+S\alpha\alpha$ (39.93–40.31 ppm)

$$P=PP+0.5PB$$

$$B=BB+0.5PB$$

Determination of the Product of the Reactivity Ratios r1xr2

The product of reactivity ratios are obtained from $^{13}$C NMR triad distribution according to C. J. Carman, R. A. Harrington and C. E. Wilkes, *Macromolecules*, 10, 536 (1977) using the following expressions.
Butene/Propylene Copolymers:

$$r_1 r_2 = 1 + \left(\frac{[PPP]+[BPP]}{[BPB]}+1\right) - \left(\frac{[B]}{[P]}+1\right)\left(\frac{[PPP]+[BPP]}{[BPB]}+1\right)^{0.5}$$

Metallocene Compounds meso dimethylsilandiylbis-6-[2,5-dimethyl-3-(2'-methylphenyl)cyclopentadienyl-[1,2-b]-thiophene]zirconium dichloride (A-1) was prepared according to WO 01/44318 rac dimethylsilylbis(2,4,6 trimethyl-indenyl)zirconium dichloride (A-2rac) was prepared according to Journal of Polymer science: Part A: polymer chemistry, vol 38, 4299-4307 (2000), dimethylsilylbis(2,4,6 trimethyl-indenyl) zirconium dichloride (A-2) was prepared according to the following procedure, it is obtained in rac meso 60:40 mixture:

Synthesis of Me$_2$Si(2,4,6-trimethylindenyl)$_2$ZrCl$_2$

Synthesis of 2,4,6-trimethyl-indan-1-one

A 500 mL, 3-neck rounded bottom flask equipped with a magnetic stirring bar and a reflux condenser, was filled with nitrogen atmosphere and charged with 71.16 g of AlCl$_3$ (0.53 mol, 2.3 eq.) dissolved in 240 mL of chlorobenzene. At room temperature 28.38 mL of m-xylene (0.23 mol, 1 eq.) were added dropwise obtaining a light yellow suspension. The flask was then cooled to 0° C. and 28.68 mL of 2-bromoisobutyryl bromide (0.23 mol, 1 eq.) were slowly added. At the end of the addition a dark-red slurry was obtained. The reaction mixture was then allowed to warm up to r.t. and stirred for 2 hours. Then it was transferred into a flask containing a solution of ice/HCl 37%=3/1. The organic phase was extracted with Et$_2$O (3×200 mL): the combined organic phases were dried over Na$_2$SO$_4$, filtered and the solvent was removed in vacuo. An orange oil was obtained as product (37.48 g, yield 93.5%). The latter was used as such without further purification in the next step.

Synthesis of 2,4,6-trimethylindan-1-ol 37.48 g of 2,4,6-trimethyl-indan-1-one (0.215 mol) were dissolved in 200 mL of EtOH in a 500 mL, 3-neck rounded bottom flask equipped with a magnetic stirring bar, a thermometer and a reflux condenser. NaBH$_4$ (15.01 g, 0.394 mol, 1.6 eq) was then slowly added keeping the temperature below 20° C. during the addition. The light yellow suspension was stirred at r.t. for 18 h. Then 100 mL of acetone were cautiously added and then the solvents were removed to give a white solid. The latter was treated with 100 mL of water and extracted with toluene (2×150 mL). The water phase was further extracted with toluene, the organic phases were combined and washed with a 10% aqueous solution of NH$_4$Cl. After washing, the organic phase was dried over Na$_2$SO$_4$, filtered and evaporated to give 35.57 g of a yellow sticky solid, which resulted to be by NMR analysis the desired product as 1.4/1 mixture of two diastereoisomers, contaminated by 5% wt. of starting indanone (yield 89.2%). The product was used as such without further purification in the next step.

Synthesis of 2,4,6-trimethyl-indene

The 2,4,6-trimethyl-indan-1-ol, prepared as above described (35.57 g, 0.192 mol), 0.5 g of p-toluenesulfonic acid monohydrate and 160 mL of toluene were placed in a 500 mL, 3-neck rounded bottom flask equipped with a magnetic stirring bar, a dean-Stark apparatus and a reflux condenser. The reaction mixture was heated at 80° C. for 3 h and 3.5 mL of water were collected. Then the reaction mixture was cooled to room temperature and treated with a saturated NaHCO$_3$ aqueous solution: the organic layer was separated, the aqueous layer extracted with Et$_2$O and the organic phases collected. After drying over Na$_2$SO$_4$, the solvent was evaporated in vacuo giving 28.46 g of an orange oil, which resulted to be the desired product by proton NMR analysis (purity 93.7% by GC-MS) contaminated by 2.0% wt. of indanone, coming from the 2,4,6-trimethylindan-1-ol step (yield 87.8%). The product was used as such in the next step without further purification.

Synthesis of Me$_2$Si(2,4,6-trimethylindenyl)$_2$ZrCl$_2$ 5 g of 2,4,6-trimethylindene (31.6 mmol) were dissolved in 100 mL of Et$_2$O, the solution was cooled to 0° C., and 13.27 mL of a 2.5 M solution of BuLi in hexane (33.2 mmol, 1.05 eq) added dropwise to it. The ice bath was removed and the reaction mixture was stirred for 1 hour. The creamy yellow slurry so obtained was cooled to 0° C., and to it were added dropwise 1.92 mL of Me$_2$SiCl$_2$ (16.5 mmol) in 20 mL of THF. After warming at room temperature, the yellow slurry was stirred for 1 h 30 min, then the solvents were removed under reduced pressure, and the residue was taken up in toluene, filtered over a G4 frit, and the residue washed with additional toluene until the filtrate was colourless (total 300 mL of toluene). The filtrate was evaporated to dryness in vacuo, to give 5.8 g of a brown oil, that proton NMR analysis confirmed to be the target ligand. This product (15.56 mmol) was dissolved into 100 mL of Et$_2$O, cooled to 0° C., and to it 12.6 mL of BuLi 2.5 M in hexane (31.5 mmol) were added dropwise. At the end of the addition, the red solution was allowed to reach room temperature, stirred for one additional hour, then cooled to 0° C. To it, a slurry of 3.67 g of ZrCl$_4$ (15.75 mmol) in 50 mL of toluene was added dropwise. The ice bath was removed, and after 2 hours stirring at room temperature, the thick yellow suspension was brought to dryness, taken up in toluene and filtered over a G4 frit. The dark filtrate was analyzed by proton NMR, dried, and slurried in a mixture of Et$_2$O (20 mL) and toluene (20 mL), filtered, and the solid residue (1.7 g) analyzed by proton NMR: the analysis confirms the formation of the target metallocene, in a meso:rac ratio of 60:40.

meso dimethylsilylbis(2-methyl-4,5 benzo-indenyl) zirconium dichloride (C-1) was prepared according to U.S. Pat. No. 5,830,821.

meso dimethylsilylbis(2-methyl-4-phenyl-indenyl) zirconium dichloride (C-2) was prepared according to U.S. Pat. No. 5,786,432.

In examples 5 and 6 instead of a pure meso form of A-2 a mixture of 60 meso and 40 racemic forms has been used. We tested the racemic form of A-2 (A-2rac) and it resulted to be inactive in butene polymerization. Therefore in examples 5 and 6 the activities are calculated with respect to the pure meso. This is a further advantage of the process of the present invention when compound A-2 is used because it is not necessary to divide the racemic form from the meso form, the racemic being inactive, but the metallocene compound can be used as such without the need of purification.

TABLE 1

| Ex | Met (mg) | $Al_{(MAO)}$/Zr | $T_{pol}$ °C. | Activity ($Kg_{PB}/g_{Met}$ * h) | I.V. (dL/g) | $M_v$ (IV) | $M_w/M_n$ | mmmm % | enthalpy ($\Delta H_f$) |
|---|---|---|---|---|---|---|---|---|---|
| 1 | A-1 (3) | 500 | 60 | 86 | 1.82 | 447500 | n.a. | <10 | n.d. |
| 2 | A-1 (3) | 500 | 70 | 124 | 1.31 | 282400 | 2.6 | <10 | n.d. |
| 3+ | A-1 (3) | 500 | 80 | 100 | 1.21 | 253700 | n.a. | n.a. | n.d. |
| 4 | A-1 (3) | 470 | 70 | 97 | 1.30 | 279500 | n.a. | n.a. | n.d. |
| 5# | A-2 (2) | 200 | 50 | 55 | 2.6 | 759700 | n.a. | <10 | n.d. |
| 6# | A-2 (1.5) | 400 | 70 | 360 | 1.20 | 250900 | n.a. | n.a. | n.d. |
| 1* | C-1 (3) | 200 | 70 | 113 | 0.47 | 77900 | n.a. | n.a. | n.a. |
| 2* | C-2 (3) | 500 | 70 | 40 | 0.87 | 164800 | n.a. | n.a. | n.a. |

*comparative
+polymerization time 120 min.
meso:rac 60:40
n.d. = not detectable
n.a. = not available The cocatalyst methylalumoxane (MAO) was a commercial product which was used as received: Crompton AG, 10% wt/vol toluene solution, 1.7 M in Al for Examples 1-6 and Comparatives Examples 1-2; Albemarle 30% wt./wt. in toluene for Examples 7-9.

Examples 1-6 and Comparative Examples 1-2

The catalyst mixture was prepared by dissolving the amount of the metallocene indicated in table 1 in 4-8 ml of toluene with the proper amount of the MAO solution (Al (MAO)/Zr ratios are reported in table 1), obtaining a solution which was stirred for 10 min at room temperature before being injected into the autoclave.

6 mmol of Al(1-Bu)$_3$ (TIBA) (as a 1 M solution in hexane) and 1350g of 1-butene were charged, at room temperature, in a 4-L jacketed stainless-steel autoclave, equipped with magnetically driven stirrer and a 35-mL stainless-steel vial, connected to a thermostat for temperature control, and previously purified by washing with an Al(i-Bu)$_3$ solution in hexanes and dried at 50° C. in a stream of nitrogen. The autoclave was then thermostatted at the polymerization temperature reported in table 1 and the catalyst system, prepared as reported above, was injected in the autoclave by means of nitrogen pressure through the stainless-steel vial. The polymerization was carried out at constant temperature, for 1 hour. Then stirring is interrupted; the pressure into the autoclave is raised to 20 bar-g with nitrogen. The bottom discharge valve is opened and the 1-butene/poly-1-butene mixture is discharged into a heated steel tank containing water at 70° C. The tank heating is switched off and a flow of nitrogen at 0.5 bar-g is fed. After cooling at room temperature, the steel tank is opened and the wet polymer collected. The wet polymer is dried in an oven under reduced pressure at 70° C.

The polymerization conditions and the characterization data of the obtained polymers are reported in Table 1.

Examples 7-9

The catalyst/cocatalyst mixture was prepared by pre-reacting 5.2 ml of MAO 30% wt. in toluene with Triisobutylaluminium (TIBA) in isododecane (110 g/L solution—$Al_{MAO}$/$Al_{TIBA}$=2/1 mole/mole); the mixture was stirred for 1 h at room temperature.

After adding additional isododecane to reach a total organometallic compounds content of 100 g/L, the toluene/isododecane solution was slowly added at room temperature to the metallocene, yielding a clear red-orange catalytic solution after 10 min stirring. The concentration of A-1 in the catalytic solution was 1.64 mg/l.

6 mmol of Al(i-Bu)$_3$ (as a 1M solution in hexane) and the amounts of monomers listed in Table 2 were charged at room temperature in a 4-L jacketed stainless-steel autoclave, equipped with magnetically driven stirrer and a 35-ml stainless-steel vial, connected to a thermostat for temperature control, previously purified by washing with an Al(i-Bu)$_3$ solution in hexanes and dried at 50° C. in a stream of nitrogen. No further monomers were fed during the polymerization.

The autoclave was then thermostated at the polymerization temperature of 60° C., and then the solution containing the catalyst/cocatalyst mixture was injected in the autoclave by means of nitrogen pressure through the stainless-steel vial, and the polymerization carried out at constant temperature for 1 h. Then stirring is interrupted; the pressure into the autoclave is raised to 20 bar-g with nitrogen. The bottom discharge valve is opened and the 1-butene/1-butene copolymer mixture is discharged into a heated steel tank containing water at 70° C. The tank heating is switched off and a flow of nitrogen at 0.5 bar-g is fed. After cooling at room temperature, the steel tank is opened and the wet polymer collected. The wet polymer is dried in an oven under reduced pressure at 70° C.

TABLE 2

| Ex. | $Al_{(MOA)}/Zr$ | % mol C3 liq ph | Yield (g) | Activity $kg/(g_{Met} \cdot h)$ | I.V. (dL/g) | C3 % mol | $r_1 x r_2$ | $(\Delta H_f)$ |
|---|---|---|---|---|---|---|---|---|
| 7 | 266 | 0 | 44 | 27 | 1.9 | 0 | n.a. | n.d. |
| 8 | 266 | 25.0 | 80 | 49 | 1.9 | 29.8 | 1 | n.d. |
| 9 | 266 | 47.0 | 139 | 85 | 1.8 | 50.8 | 1 | n.d. | n.d. = not detectable
n.a. not available

The invention claimed is:

1. A process for obtaining an atactic, amorphous 1-butene homopolymer comprising polymerizing 1-butene in the presence of a catalyst system obtained by contacting:

a) at least one meso or meso-like metallocene compound of formula (I)

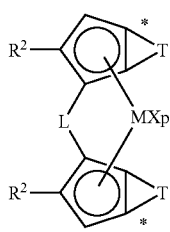

wherein

M is an atom of a transition metal selected from those belonging to group 3, 4, 5, 6 or to the lanthanide or actinide groups in the Periodic Table of Elements;

p is an integer from 0 to 3, wherein p is equal to a formal oxidation state of M minus 2;

X, same or different, is hydrogen, halogen, R, OR, $OSO_2CF_3$, OCOR, SR, $NR_2$ or $PR_2$, wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical, optionally comprising at least one heteroatom belonging to groups 13-17 of the Periodic Table of Elements; or two X can optionally form a substituted or unsubstituted butadienyl radical or a OR'O group wherein R' is a divalent radical selected from a $C_1$-$C_{40}$ alkylidene, $C_6$-$C_{40}$ arylidene, $C_7$-$C_{40}$ alkylarylidene or $C_7$-$C_{40}$ arylalkylidene radical;

L is a divalent $C_1$-$C_{40}$ hydrocarbon radical optionally comprising at least one heteroatom belonging to groups 13-17 of the Periodic Table of Elements, or a divalent silylidene radical comprising up to 5 silicon atoms;

$R^1$ and $R^2$, same or different, are $C_1$-$C_{40}$ hydrocarbon radicals optionally comprising at least one heteroatom belonging to groups 13-17 of the Periodic Table of Elements;

T, same or different, are a moiety of formula (IIa) or (IIb):

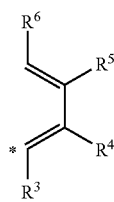

-continued

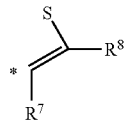

wherein the atom marked with the symbol * bonds the atom marked with the same symbol in the compound of formula (I);

$R^3$ is a $C_1$-$C_{40}$ hydrocarbon radical optionally comprising at least one heteroatom belonging to groups 13-17 of the Periodic Table of Elements;

$R^4$ and $R^6$, same or different, are hydrogen or $C_1$-$C_{40}$ hydrocarbon radicals optionally comprising at least one heteroatom belonging to groups 13-17 of the Periodic Table of Elements;

$R^5$ is a $C_1$-$C_{40}$ hydrocarbon radical optionally comprising at least one heteroatom belonging to groups 13-17 of the Periodic Table of Elements;

$R^7$ and $R^8$, same or different, are hydrogen or $C_1$-$C_{40}$ hydrocarbon radicals optionally comprising at least one heteroatom belonging to groups 13-17 of the Periodic Table of Elements; and b) an alumoxane or a compound capable of forming an alkyl metallocene cation;

wherein the atactic, amorphous 1-butene homopolymer comprises an isotactic pentad content (mmmm) lower than 15% and an intrinsic viscosity of at least 1.3 dL/g.

2. The process according to claim 1, wherein the catalyst system further comprises c) an organo aluminum compound.

3. The process according to claim 1, wherein

M is titanium, zirconium or hafnium;

X is hydrogen, halogen, or R, wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical, optionally comprising at least one heteroatom belonging to groups 13-17 of the Periodic Table of Elements;

p is 2; and

L is a divalent hydrocarbon radical selected from a $C_1$-$C_{40}$ alkylidene, $C_3$-$C_{40}$ cycloalkylidene, $C_6$-$C_{40}$ arylidene, $C_7$-$C_{40}$ alkylarylidene, or $C_7$-$C_{40}$ arylalkylidene radical optionally comprising at least one heteroatom belonging to groups 13-17 of the Periodic Table of Elements, or a silylidene radical comprising up to 5 silicon atoms.

4. The process according to claim 1, wherein L is $(Z(R'')_2)_n$, and wherein

Z is carbon or silicon;

n is 1 or 2; and

R'' is a $C_1$-$C_{20}$ hydrocarbon radical optionally comprising at least one heteroatom belonging to groups 13-17 of the Periodic Table of Elements.

5. The process according to claim 1, wherein
$R^1$ and $R^2$ are linear or branched $C_1$-$C_{20}$-alkyl radicals;
$R^3$ is a linear or branched, $C_1$-$C_{20}$-alkyl, $C_6$-$C_{40}$-aryl, or $C_7$-$C_{40}$-arylalkyl radical;
$R^4$ and $R^6$ are hydrogen;
$R^5$ is a linear or branched $C_1$-$C_{20}$-alkyl radical; and
$R^8$ is hydrogen, or a linear or branched $C_1$-$C_{20}$-alkyl radical; and
$R^7$ is a $C_1$-$C_{40}$-alkyl, $C_6$-$C_{40}$-aryl or a $C_7$-$C_{40}$-arylalkyl radical.

6. The process according to claim 5, wherein $R^7$ is a group of formula (III)

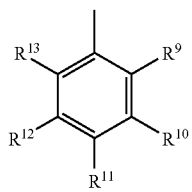

(III)

wherein $R^9$, $R^{10}$, $R^{11}$, $R^{12}$ and $R^{13}$, same or different, are hydrogen, or linear or branched, cyclic or acyclic, $C_1$-$C_{20}$-alkyl, $C_2$-$C_{20}$ alkenyl, $C_2$-$C_{20}$ alkynyl, $C_6$-$C_{20}$-aryl, $C_7$-$C_{20}$-alkylaryl or $C_7$-$C_{20}$-arylalkyl radicals, optionally comprising at least one heteroatom belonging to groups 13-17 of the Periodic Table of Elements.

7. The process according to claim 1, wherein the meso or meso-like metallocene compound has formula (IV):

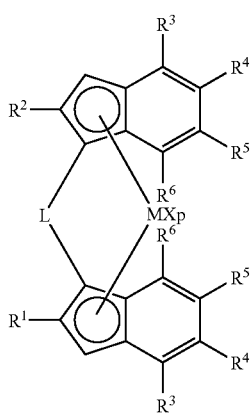

(IV)

wherein
M is an atom of a transition metal selected from those belonging to group 3, 4, 5, 6 or to the lanthanide or actinide groups in the Periodic Table of Elements;
X, same or different, is hydrogen, halogen, R, OR, $OSO_2CF_3$, OCOR, SR, $NR_2$ or $PR_2$, wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical, optionally comprising at least one heteroatom belonging to groups 13-17 of the Periodic Table of Elements; or two X can optionally form a substituted or unsubstituted butadienyl radical or a OR'O group wherein R' is a divalent radical selected from a $C_1$-$C_{40}$ alkylidene, $C_6$-$C_{40}$ arylidene, $C_7$-$C_{40}$ alkylarylidene or $C_7$-$C_{40}$ arylalkylidene radical;
p is an integer from 0 to 3, wherein p is equal to a formal oxidation state of M minus 2;
L is a divalent $C_1$-$C_{40}$ hydrocarbon radical optionally comprising at least one heteroatom belonging to groups 13-17 of the Periodic Table of Elements, or a divalent silylidene radical comprising up to 5 silicon atoms;
$R^1$ and $R^2$, same or different, are $C_1$-$C_{40}$ hydrocarbon radicals optionally comprising at least one heteroatom belonging to groups 13-17 of the Periodic Table of Elements;
$R^3$ is a $C_1$-$C_{40}$ hydrocarbon radical optionally comprising at least one heteroatom belonging to groups 13-17 of the Periodic Table of Elements;
$R^4$ and $R^6$, same or different, are hydrogen or $C_1$-$C_{40}$ hydrocarbon radicals optionally comprising at least one heteroatom belonging to groups 13-17 of the Periodic Table of Elements;
$R^5$ is a $C_1$-$C_{40}$ hydrocarbon radical optionally comprising at least one heteroatom belonging to groups 13-17 of the Periodic Table of Elements.

8. The process according to claim 1, wherein the meso or meso-like metallocene compound has formula (V):

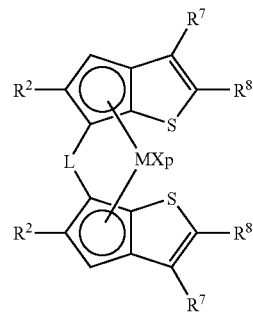

wherein
M is an atom of a transition metal selected from those belonging to group 3, 4, 5, 6 or to the lanthanide or actinide groups in the Periodic Table of Elements;
X, same or different, is hydrogen, halogen, R, OR, $OSO_2CF_3$, OCOR, SR, $NR_2$ or $PR_2$, wherein R is a linear or branched, cyclic or acyclic, $C_1$-$C_{40}$-alkyl, $C_2$-$C_{40}$ alkenyl, $C_2$-$C_{40}$ alkynyl, $C_6$-$C_{40}$-aryl, $C_7$-$C_{40}$-alkylaryl or $C_7$-$C_{40}$-arylalkyl radical, optionally comprising at least one heteroatom belonging to groups 13-17 of the Periodic Table of Elements; or two X can optionally form a substituted or unsubstituted butadienyl radical or a OR'O group wherein R' is a divalent radical selected from a $C_1$-$C_{40}$ alkylidene, $C_6$-$C_{40}$ arylidene, $C_7$-$C_{40}$ alkylarylidene or $C_7$-$C_{40}$ arylalkylidene radical;
p is an integer from 0 to 3, wherein p is equal to a formal oxidation state of M minus 2;
L is a divalent $C_1$-$C_{40}$ hydrocarbon radical optionally comprising at least one heteroatom belonging to groups 13-17 of the Periodic Table of Elements, or a divalent silylidene radical comprising up to 5 silicon atoms;
$R^1$ and $R^2$, same or different, are $C_1$-$C_{40}$ hydrocarbon radicals optionally comprising at least one heteroatom belonging to groups 13-17 of the Periodic Table of Elements;

$R^7$ and $R^8$, same or different, are hydrogen or $C_1$-$C_{40}$ hydrocarbon radicals optionally comprising at least one heteroatom belonging to groups 13-17 of the Periodic Table of Elements.

9. The process of claim 1 wherein the intrinsic viscosity is at least 1.8 dL/g.

10. The process of claim 9 wherein the intrinsic viscosity is at least 2.0 dL/g.

* * * * *